United States Patent [19]

Erdmann et al.

[11] 4,148,587

[45] Apr. 10, 1979

[54] LASER GAUGE FOR MEASURING CHANGES IN THE SURFACE CONTOUR OF A MOVING PART

[75] Inventors: Joachim C. Erdmann, Seattle; Robert I. Gellert, Redmond; Richard L. Skaugset, Kennewick, all of Wash.

[73] Assignee: The Boeing Company, Seattle, Wash.

[21] Appl. No.: 838,672

[22] Filed: Oct. 3, 1977

[51] Int. Cl.² ............................................. G01B 9/02
[52] U.S. Cl. .................................. 356/356; 250/201; 356/5; 356/359
[58] Field of Search ........................ 356/5, 111, 109; 250/201

[56] References Cited

U.S. PATENT DOCUMENTS

3,901,597   8/1975   White .................................. 356/5 X

Primary Examiner—John K. Corbin
Assistant Examiner—Matthew W. Koren
Attorney, Agent, or Firm—Christensen, O'Connor, Johnson & Kindness

[57] ABSTRACT

A gauge for measuring small changes in the contour of the surface of a moving part, such as a rotating cylinder or sliding flat surface, as the part passes a point, using a monochromatic source of coherent light is disclosed. The gauge is based on the fact that the size and rate of movement of the speckles of a speckle pattern (formed by coherent light focused onto a nonspecular moving surface) vary in accordance with whether or not the beam is actually focused on the surface. In the preferred form of the present invention, an expanded and collimated laser beam is focused by a focusing lens onto the surface of the moving part. The speckle pattern light reflected by the moving surface is received by one or more photodetectors. The photodetectors develop pulses at a rate determined by the rate of speckle movement. These pulses are applied to a signal processor that counts them, if they are above a predetermined level. Pulse counts are made over predetermined time periods; and, if speckle size, as well as speckle rate is used as the measurements basis, only pulses occurring simultaneously on the outputs of two photodetectors are counted. The pulse counts made during adjacent time periods are analyzed by a signal processor and, then, compared. The results of the comparisons are used to control the focusing lens such that the coherent beam is brought to, and maintained in, focus on the surface of the part. Focus exists when the pulse count is maintained at a maximum level. The focusing lens position is denoted by an indicating scale mechanism, which provides the displacement information needed to determine the size of changes in the contour of the surface that cause refocusing of the focusing lens.

31 Claims, 5 Drawing Figures

LASER GAUGE FOR MEASURING CHANGES IN THE SURFACE CONTOUR OF A MOVING PART

BACKGROUND OF THE INVENTION

This invention is directed to measuring instruments and, more particularly, to optical measuring gauges.

The present invention was developed for use in monitoring the change in the contour of the surface of a part (e.g., elevational changes) while the part is being machined by a lathe or other machine tool, for example. Since the invention was developed for use in machine tool environments, it will be described and illustrated in such an environment. However, it is to be understood, and will be readily recognized by those skilled in the art and others, that the invention is also useful in other environments. In general, the invention is useful in any environment where it is desirable to detect small changes in the contour of a moving surface along an axis normal to the surface, without contacting the surface. For example, the invention can be used to detect the transverse movement (vibration) of the rotating shaft of a ship in order to determine when said transverse movement exceeds an acceptable level. The present invention can also be used to provide an automatic focusing device useful in the precise photography of a moving surface, for another example.

In many environments, it is desirable to precisely measure the change in surface contour of a moving item or part without contacting the surface whose change is to be measured. Such a requirement is particularly important in environments where unwanted electrical grounds may occur if the sensing device contacts the moving surface and in environments where a contacting sensor may score or mar the moving surface. Such a requirement is also important in environments where the part is rough and moving rapidly, because contacting sensing elements will rapidly wear away and be destroyed. This latter problem is of particular significance in machine tool environments.

In the past, small displacements in the surface contour of a rotating cylinder or a sliding, flat surface have been measured using capacitive or inductive transducers as the sensing element. These systems have the disadvantage that they are effective only over short distances. Thus, it is impossible to use them when the displacement range of the moving surface may vary over several inches, or when it is impossible to position such devices near the surface because of other objects or items. Moreover, in some environments inductive and capacitive devices cannot be used because it is impossible to shield them from the effects of extraneous magnetic and electrostatic fields located in the measuring vicinity, which act to distort the resultant information.

In environments wherein a noncontacting sensor is required, and capacitive or inductive transducer sensors cannot be used, the prior art has proposed the use of optical gauges, many of which use interferometer principles. Optical gauges using interferometer principles have the disadvantage that they measure contour changes only, and not absolute values of surface contour. Such a measuring technique also has the disadvantage that any temporary interruption of the light transmission path during measuring will render the resultant measurement in error and, thus, useless. In addition, interferometric techniques require specular (highly polished) surfaces on parts to be measured, along with precise alignment prior to measurement.

Other prior art optical gauges proposed for use in machine tool environments have mounted a retroreflector on the tool holder. Light is directed toward the retroreflector and reflected back to a sensor. The transmission time is measured and used to determine the position of the retroreflector with respect to the light source and/or the photodetector. However, this arrangement also has disadvantages. Specifically, prior art optical gauges using retroreflectors measure tool-holder position, not part position. While the information developed is related to changes in the surface of the moving part normal to the beam, the information is subject to error because it does not compensate for tool wear, tool holder wear, or any misalignment between the position of the retroreflector and the actual part. More specifically, retroreflector type optical gauges do not compensate for any mechanical errors present between the retroreflector and the part being machined, said errors being primarily caused by wear and misalignment.

Therefore, it is an object of this invention to provide a new and improved optical measuring gauge.

It is another object of this invention to provide a new and improved noncontacting surface contour measuring gauge.

It is a further object of this invention to provide a new and improved optical gauge for measuring changes in the surface contour of a moving part.

It is still another object of this invention to provide an optical gauge that measures the absolute value of surface contour changes.

It is a still further object of this invention to provide an optical surface contour measurement gauge that makes measurements directly from the surface of a moving part.

It is a still further object of this invention to provide an optical gauge suitable for use in a machine tool environment for measuring changes in the contour of the surface of a moving part, as the part moves past a point.

SUMMARY OF THE INVENTION

In accordance with the present invention, a monochromatic coherent light beam, such as a laser beam, is collimated and focused, by a focusing lens, onto the nonspecular surface of a moving part, such as a part being machined by a lathe or other machine tool, for examples. The focusing lens is mounted for movement in a direction normal to the surface of the moving part. A portion of the light reflected back along the axis of the beam by the moving surface is optically collected and directed toward the light sensitive surface of one or more photodetectors such that a speckle pattern is formed at the detection plane of the photodetector(s). The speckle pattern causes the photodetector(s) to develop pulses at a rate related to the rate of movement of the speckles creating the speckle pattern. The pulse output of the photodetector(s) is processed by a signal processor to provide control signals that are used to control the position of the focusing lens. More specifically, the control signals are used to control the direction and distance of lens movement necessary to maintain the light beam focused on the moving surface. This result is accomplished by the signal processor counting the pulses produced by the photodetector(s) over predetermined intervals and comparing adjacent pulse counts. The results of the comparisons are used to move the focusing lens in a direction that causes the pulse output of the photodetector(s) to be at a maximum.

In the preferred form of the present invention, the focusing lens is mounted on a carriage driven back and forth by a stepping motor. Mounted on the carriage is an indicator that coacts with a scale mounted in a fixed position along an axis lying parallel to the direction of lens movement. This arrangement allows the position of the focusing lens to be rapidly determined by reading the position of the indicator. Alternatively, the position of the indicator can be detected by a suitable position detector and the resultant information used in an overall control system to control the position of the tool being used to machine the part.

The gauge of the present invention is based on the phenomena of speckled reflection of coherent light from a rough surface. Coherent light, such as the light produced by a laser, reflecting from a rough (nonspecular) surface, rather than producing a well-defined spot of light, produces instead a pattern of randomly shaped spots of light, known as a speckled pattern. The average size of the randomly shaped spots of light or speckles in a given reflection vary in accordance with whether or not the incident beam is focused on the reflecting surface. The average speckle size is a maximum value when the focus of the incident beam coincides with the reflecting surface and drops off sharply if the illuminating system is slightly defocused. Also, if the reflecting surface is in motion, the speckle pattern constantly changes as the light beam focuses on different parts of the moving surface. The rate of change in the speckle pattern (speckle rate) is related to the rate of motion of the surface and is also dependent upon whether or not the incident beam is focused on the reflecting surface. In a typical machine tool application, for example, a part being machined in a lathe, the rate of motion of the surface will be constant and, therefore, the speckle rate will be solely dependent upon the focus of the light beam, with the speckle rate being maximum when the laser beam is focused on the surface of the moving part.

The actual configuration of a gauge formed in accordance with the present invention will depend upon whether or not the error signal is to be based solely on speckle rate variations, or is to be based on a combination of speckle rate variation and speckle size variation. The preferred configuration is based on speckle rate and speckle size. If speckle rate and speckle size variations are both used, the reflected light is directed toward two spaced photodetectors. If speckle rate alone is used, reflected light is directed toward a single photodetector. In either case, the photodetector outputs are pulse trains that are analyzed by a signal processor and the result used to control the direction of movement of the focusing lens, as discussed above.

In the case of a two photodetector embodiment of the invention, the distance between the two photodetectors is such that the photodetectors will receive reflected light from the same speckle source when the speckle is average in size. The actual distance is not critical; normally, it is of the order of a few millimeters. In this embodiment of the invention, the signals from the two photodetectors are analyzed by a correlator that develops cross-correlation function between the two signals by ANDing the signals together to determine when the signals are coincident. Statistically, the probability is that both detectors will be coincidentally illuminated 50 percent of the time, even though the illumination is produced by different speckles. This is the case when the system is far out of focus, since speckle size is small. As the in-focus condition is approached, speckle size increases and the two detectors are more and more often overlapped by the same speckle. Since the mean speckle size increases and reaches a maximum at the in-focus condition, the cross correlation function peaks at the in-focus position. Thus, the output is a pulse train whose rate is related to the focus state of the light beam. The single photodetector embodiment also produces a pulse train related solely to speckle rate, i.e., no coincidental determination is made.

Regardless of whether one or two photodetectors are used, preferably, the resultant pulse trains are applied to a binary counter during adjacent predetermined fixed periods of time. At the end of each period, the contents of the counter are transferred to a first register and the counter is cleared. At the time data is transferred from the counter to the first register, count data in the first register is transferred to a second register. Thus, the first and second registers store pulse counts for immediately adjacent periods of time. The contents of the two registers, representing the present and prior pulse counts, are continuously compared and the result used to control the direction of focusing lens movement. That is, each comparison showing a first register value larger than, or equal to, the preceding value (as stored in the second register), causes the focusing lens to move in one direction while a comparison showing a decrease in pulse counts causes focusing lens movement in the opposite direction. The rate or speed of focusing lens movement is controlled by multiplying the output of the first register with an intensity signal derived from the output of one photodetector. The result of the multiplication is used in an inverse manner to control the output of a voltage controlled oscillator. Thus, the frequency of the pulses produced by the VCO decreases as focus is approached. The pulses produced by the VCO, of course, cause rotation of the shaft of the stepping motor used to control the position of the carriage on which the focusing lens is mounted. These pulses are applied directly or inverted before being applied to the stepping motor in accordance with the results of the comparison, whereby the results of the comparison control the direction of movement of the focusing lens.

From the foregoing summary, it will be appreciated that a new and improved optical gauge for measuring changes in the contour of the surface of a moving part along an axis normal to the surface is disclosed. The gauge of the invention is noncontacting and ideally suitable for use in a machine tool environment. The moving part may be rotating or sliding. In either case, the coherent beam intersects the moving surface along an axis normal to the surface at the point of impingement. Because the invention is optical, rather than capacitive or inductive, it does not have the disadvantages of capacitive and inductive noncontacting arrangements, discussed above. Moreover, because the invention does not use an interferrometer technique, it does not have the disadvantage of prior art optical systems using interferrometer techniques. Also, because the invention does not use a retroreflector mounted on a tool located adjacent to a part, but rather uses the surface of the part directly, it does not have the disadvantages of retroreflector type optical systems, also discussed above. Thus, any error due to tool holder wear, machine wear, or other misalignment are not present. As noted above, the invention is not only useful in machine tool environments, it is also useful in other environments wherein it is desired to maintain a particular item, such as a focusing lens, at a particular position with respect to a moving surface; or, where it is desired to detect changes in the contour or position of a moving surface.

BRIEF DESCRIPTION OF THE DRAWINGS

The foregoing objects and many of the attendant advantages of this invention will become more readily appreciated as the same becomes better understood by reference to the following detailed description, when taken in conjunction with the accompanying drawings wherein.

DESCRIPTION OF THE PREFERRED EMBODIMENTS

Figure 1:
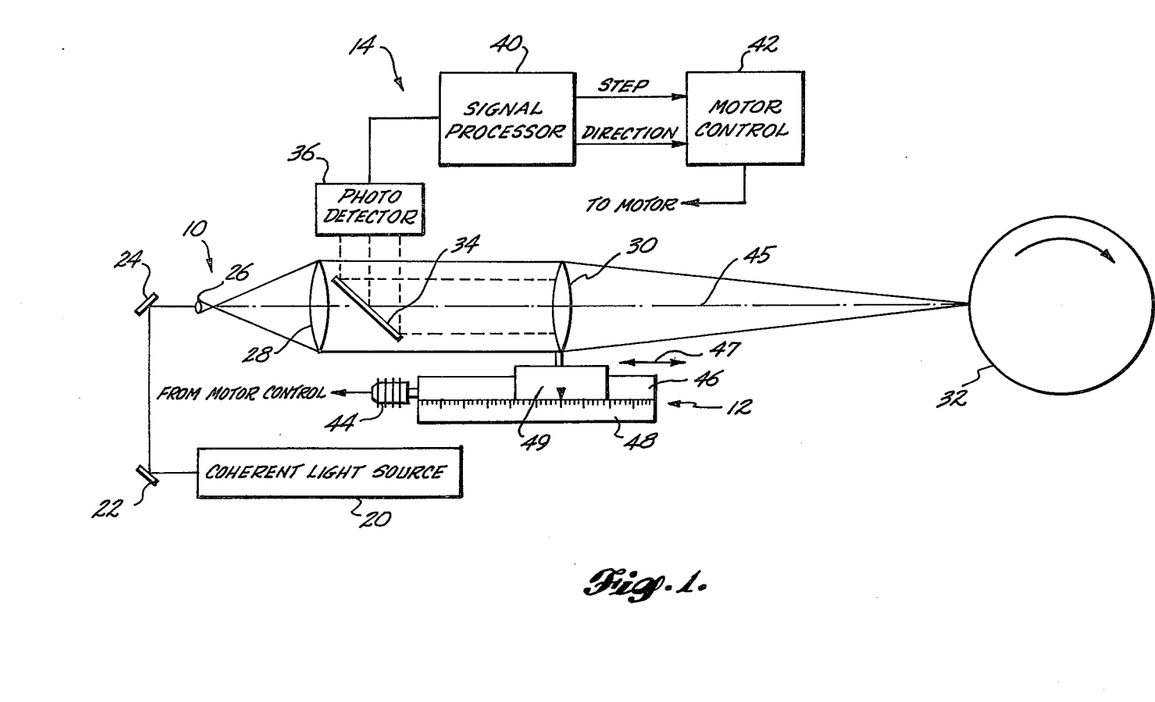
FIG. 1 is a partially block and partially pictorial diagram of a preferred embodiment of a laser gauge for measuring changes in the surface contour of a moving part, formed in accordance with the invention.

FIG. 1 is a diagram of a preferred embodiment of a laser gauge measurement system formed in accordance with the invention and comprises: an optical system 10; a translation stage 12; and a detecting and motor control system 14. The optical system 10 includes a pair of redirecting planar mirrors (or prisms) 22 and 24. Light from a coherent light source 20, which may take the form of a laser, is received by the first redirecting mirror 22 and directed toward the second redirecting mirror 24. The second redirecting mirror 24 directs the laser light toward an expanding lens 26. The expanding lens 26 expands the laser light and directs it toward a collecting lens 28. Light collected by the collecting lens 28 is focused by a focusing lens 30 onto the surface of a part 32, illustrated as a rotating cylinder. The optical axis 45 of the focusing lens is normal to the surface of the part 32 at the point of impingement.

The translation stage 12 includes a stepping motor 44, a carriage 46 and an indicator scale 48. The shaft of the stepping motor 44 is attached to the carriage 46 by a suitable rotary to linear conversion mechanism (such as a turnscrew mounted in a threaded follower) such that movement of the shaft rotationally in one direction or the other cuases corresponding linear movement of the carriage 46 parallel to the optical axis 45 of the focusing lens 30, as indicated by the arrow 47. The focusing lens 30 is mounted on the carriage 46. Thus, movement of the carriage 46 causes the focusing lens 30 to be moved back and forth, along the optical axis 45 of the focusing lens. Thus, the focusing lens is moved along a line orthogonal or normal to the point of impingement of the light focused by the focusing lens 30 onto the surface of the part 32. The scale 48 is mounted adjacent to the carriage 46 so as to cooperate with an indicator 49 mounted on the carriage 46. Thus, as the carriage 46 is moved back and forth in the manner herein described, the position of the carriage and, thus, the focusing lens 30, is readily determined by determining the position of the indicator 49 with respect to the scale 48.

The detecting and motor control system 14 includes a narrow mirror 34 (the long side of which is illustrated in FIG. 1) mounted transversely along the optical axis 45 of the focusing lens 30, between the collimating lens 28 and the focusing lens. The mirror may be one-way so that light passes through the mirror when coming from the laser but is reflected when approaching the mirror from the opposite direction. Or the mirror may be narrow enough not to have an undue effect on light moving toward the part. The detecting and motor control system 14 also includes one or more photodetectors 36, a signal processor 40 and a motor control 42. The photodetector(s) 36 is mounted so as to detect light reflected by the thin mirror 34. The output of the photodetector(s) is connected to the signal processor 40. The signal processor analyzes the output of the photodetector(s) in the manner hereinafter described and, in accordance therewith, produces two control signals, denoted direction and step. The direction and step signals are applied to the motor control 42. In accordance therewith, the motor control 42 applies step control pulses to the stepper motor 44.

In operation, the light emitted by the coherent light source 20 is redirected by the first and second redirecting mirrors 22 and 24, expanded by the expanding lens 26 and collimated by the collimating lens 28. The collimated light is focused by the focusing lens 30 onto the surface of the moving part 32. The moving part reflects light, in the form of small spots of light or speckles, back along the optical axis 45. The reflected light is received by the focusing lens 30 and, thus, by the narrow mirror 34. The mirror 34 directs the light onto the photosensitive surface of the photodetector(s). The position of the narrow mirror 34 and the photodetector(s) is such that a speckle pattern is formed at the photosensitive surface of the photodetector(s). As herein described, a speckle pattern is formed when coherent light is reflected from a nonspecular (rough) surface. The speckles forming the speckle pattern cause pulses to occur across the output of the photodetector(s). The output of the photodetector(s), as more fully hereinafter described, is processed by the signal processor and controls the nature of the direction signals and the production of step pulses. The step pulses and direction signal cause the motor control 42 to control the movement (stepping) of the shaft of the stepping motor 44. As long as the incident light is exactly focused on the surface of the moving part 32, no step pulses occur. However, when an out-of-focus condition develops, as a result, for example, of a tool cutting away a portion of the surface of the part 32, the signal processor 44 produces one or more step pulses. The step pulses via the motor control cause the shaft of the stepping motor 44 to rotate in the direction denoted by the direction signal, i.e., clockwise or counterclockwise. The direction is such that the focusing lens is moved toward focus. The focusing lens 30 is moved until the laser beam is again exactly focused on the surface of the part 32. The change in position of the focusing lens 30 is denoted by the change in position of the indicator 49 with respect to the scale 48. Thus, the change in position of the indicator or the net change in stepping motor pulses (times a scale factor) denotes the change in surface contour of the part.

The invention is based on the fact that light reflected from a nonspecular (rough) surface will form a speckle pattern, i.e., a pattern of light and dark areas, the light areas or spots forming speckles. The speckles are largest at the image plane of the focusing lens when the beam is in focus. That is, when the focal point of the focusing lens 30 coincides with the surface of the part 32, the speckle size is a maximum at the image plane of the focusing lens 30, which is the plane at which the photodetector(s) 36 are located. When the focal point of the focusing lens 30 is not exactly focused on the surface of the part 32, the size of the speckles decreases. In addition to this speckle size phenomena, the speckle rate, i.e., the number of speckles impinging on the photodetector(s) per unit of time increases as a result of decreasing beam diameter at the focus position. That is, at focus, the size of the laser beam incident on the surface of the part is at its smallest and a larger number of speckles are detected. This result occurs because, at focus, a larger number of beam diameters are crossed per unit time by the moving target surface. Because a larger number of beam diameters are crossed, the speckle rate increases, whereby the number of pulses developed across the output of the photodetector(s) increases. Thus, the photodetector pulse rate is related to the focus position of the focusing lens 30. The signal processor uses the pulse rate information to produce the step and direction signals in the manner hereinafter described.

Figure 2:
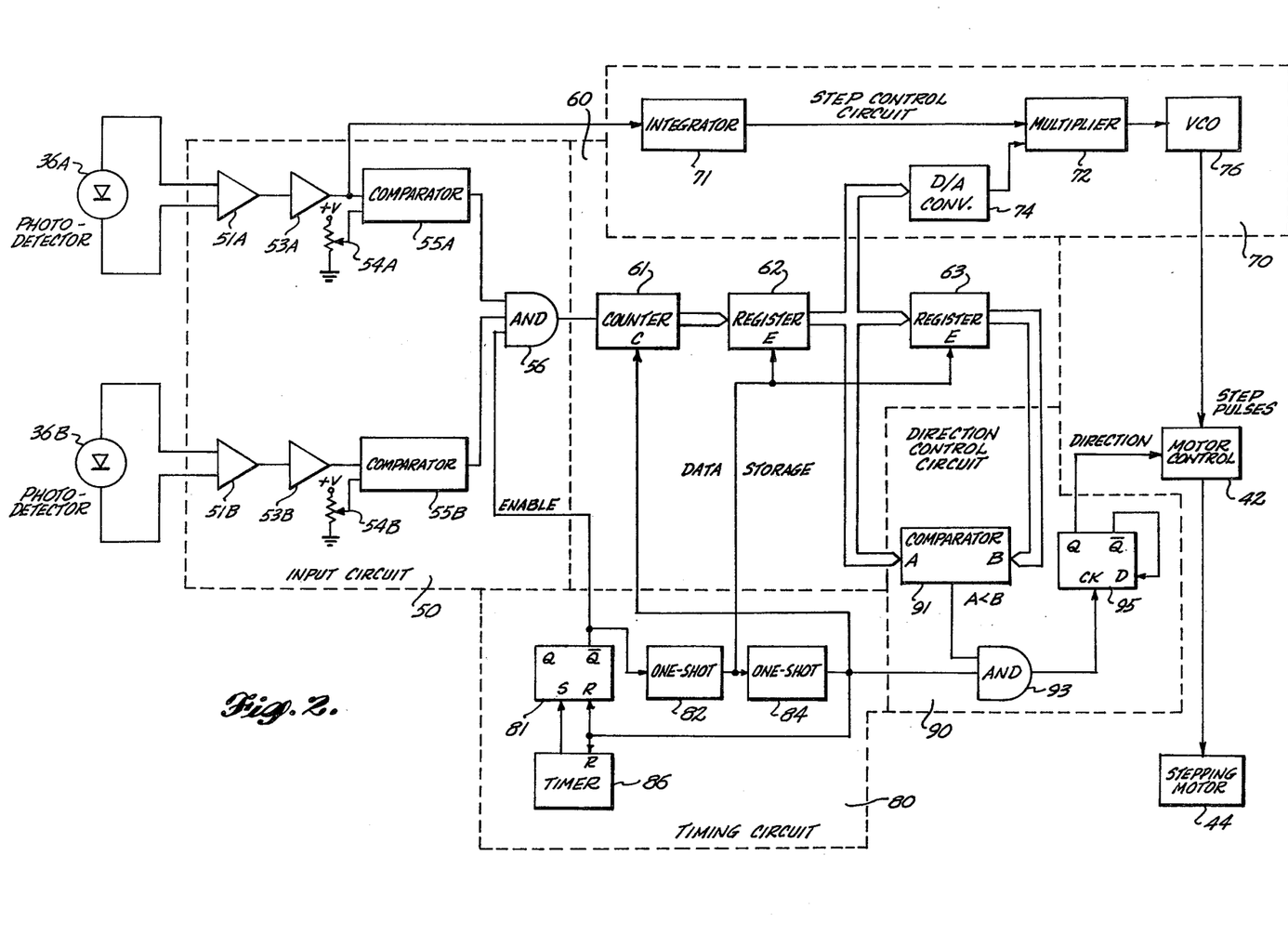
FIG. 2 is a block diagram of a two photodetector signal processor and motor control suitable for use in the embodiment of the invention illustrated in FIG. 1.

FIG. 2 is a block diagram illustrating a signal processor formed in accordance with the invention for use when two photodetectors are mounted so as to detect the rate and size of the speckles forming a speckle pattern. That is, the signal processor illustrated in FIG. 2 is operatively based on both the speckle rate and size phenomena discussed above, as opposed to only being based only on speckle rate change phenomena.

The signal processor illustrated in FIG. 2 includes: an input circuit 50; a data storage subsystem 60; a step control circuit 70; a timing circuit 80; and, a direction control circuit 90. The input circuit 50 is a cross correlator circuit that includes: first and second operational amplifiers 51A and 51B; first and second preamplifiers 53A and 53B; first and second potentiometers 54A and 54B; first and second comparators 55A and 55B; and, a three-input AND gate 56.

One photodetector 36A is connected across the input of the first operational amplifier 51A and the other photodetector 36B is connected across the input of the second operational amplifier 51B. The output of the first operational amplifier 51A is connected to the input of the first preamplifier 53A and the output of the first preamplifier 53A is connected to one input of the first comparator 55A. Similarly, the output of the second operational amplifier 51B is connected to the input of the second preamplifier 53B and the output of the second preamplifier 53B is connected to one input of the second comparator 55B. Potentiometers 54A and 54B are each connected between a voltage source designated +V and ground. The sliding contact of the first potentiometer 54A is connected to the second input of the first comparator 55A and the sliding contact of the second potentiometer 54B is connected to the second input of the second comparator 55B. The outputs of the first and second comparators are each connected to one input of the AND gate 56. The third input of the AND gate 56 is an enable input, which is connected to receive an output of the timing circuit 80 produced in the manner hereinafter described.

In operation, the operational amplifiers 51A and 51B amplify the pulses developed when speckle light impinges on the photosensitive surface of the photodetectors. The amplified pulses are applied to the inputs of the related first or second comparator 55A and 55B. If the amplitude of a received pulse is above the detection level set by an adjustable arm of the related potentiometer 54A or 54B, the comparator produces a pulse. If both comparators produce pulses during overlapping time periods, and if the AND gate is enabled, a pulse occurs on the output of the AND gate. Thus, the input circuit forms a cross-correlator, which requires that light above a preset level of intensity simultaneously impinge on the photodetectors 36A and 36B, in order for a pulse to be produced. While the amplifiers 51A and 51B are illustrated as DC coupled to their respective photodetectors, they can be AC coupled, if desired. If AC coupled, the speckle created signal will settle to a mean value, whereby a zero threshold level can be conveniently used to detect pulses, i.e., the potentiometers 54A and 54B can be set to ground level. On the other hand, if the amplifiers are DC coupled, as shown, the threshold value can be readily varied, whereby acceptable suitable speckle pulse count rates can be set by adjusting the level of the voltage applied by the potentiometers to their respective comparators.

It is pointed out here that the photodetectors may take on any one of various well-known forms, including photodiodes (illustrated), photo transistors, charge coupled devices, etc.

The photodetectors 36A and 36B are spaced from one another such that they will simultaneously receive light reflected from the same speckle source when the speckle is average in size and the focusing lens is focused on the part 32. The actual spacing is not critical; normally, it will be in the order of a few millimeters. In this regard, statistically, the probability is that both photodetectors will be coincidentally illuminated 50 percent of the time, even though the illumination is produced by different speckles, because speckles and dark areas are about the same size. This is the situation that exists when the focusing lens is far out of focus and speckle size is small. As focus is approached, speckle size increases and the two photodetectors 36A and 36B more and more often receive light from the same speckle. Maximum coincidence occurs at focus. Thus, the rate of the pulses developed on the output of the AND gate 56 is a maximum at focus. The actual pulse rate increase is actually a result of two phenomena—an increase in the absolute level of speckle rate and an increase in the rate of coincidence of light from the same speckle being received by both photodetectors.

The data storage subsystem 60 comprises: a counter 61; and, first and second registers 62 and 63. The output of the AND gate 56 is connected to the count input of the counter 61. The counter 61 produces a parallel output denoting the number of pulses counted. The output of the counter is applied to the input of the first register 62 and the output of the first register 62 is applied to the input of the second register 63. The clear input of the counter 61 is connected so as to clear receive a signal from the timing circuit 80, produced in the manner hereinafter described. The enable inputs of the first and second registers 62 and 63 are connected to receive enable signals produced by the timing circuit, also produced in the manner hereinafter described.

In operation, after being cleared, the counter 61 counts the pulses occurring on the output of the AND gate 56. After a predetermined time period the first register is enabled and the count value contained in the counter is transferred to the first register 62. At the same time any count stored in the first register is transferred to the second register 63. Thereafter the counter 61 is cleared and the cycle is repeated. Thus, the first and second registers always contain count values made during the last and the immediately preceding time periods, respectively. These count values are compared by the direction control circuit 90 in the manner hereinafter described and control the nature of the direction signal.

The timing circuit 80 comprises: an SR flip-flop 81; first and second one-shots 82 and 84; and, a timer 86. The output of the timer 86 is connected to the S (set) input of the SR flip-flop 81. The $\overline{Q}$ output of the SR flip-flop is connected to the enable input of the AND gate 56 of the input circuit 50. The $\overline{Q}$ output of the SR flip-flop is also connected to the input of the first one-shot 82. The output of the first one-shot 82 is connected to the enable inputs of the first and second registers 62 and 63 of the data storage subsystem 60 and to the input of the second one-shot 84. The output of the second one-shot 84 is connected to the clear input of the counter 61 of the data storage subsystem and to the R (reset) inputs of the SR flip-flop 81 and the timer 86.

Initially, the SR flip-flop and the timer 86 are reset when the second one-shot 84 is fired. When reset, the SR flip-flop enables the AND gate 56. The pulses formed on the output of the AND gate 56 of the input circuit 50 are then counted by the counter 61 in the manner previously described. After a predetermined period of time, the timer 86 produces an output pulse that sets the SR flip-flop 81. When this occurs, the $\overline{Q}$ output of the SR flip-flop goes low and the AND gate 56 of the input circuit 50 is disabled. At the same time, the high-low shift of the $\overline{Q}$ output of the SR flip-flop 81 fires the first one-shot 82. When the first one-shot 82 is fired, the first and second registers 62 and 63 are enabled. Thus, the first register 62 reads the count value stored in the counter 61. At the same time, the second register 63 reads the count value stored in the first register 62. (If necessary, a time delay may be included between the output of the first one-shot and the first register to allow the second register to read the count value stored in the first register prior to that value changing as a result of the first register reading the count value stored in the counter.) After a predetermined period of time, the output of the first one-shot terminates, i.e., returns low. This shift causes the second one-shot to fire. When the second one-shot fires, the counter 61 is cleared, and the SR flip-flop and the timer are reset. Thereafter, the cycle is repeated.

The step control circuit 70 includes: an integrator 71; a multiplier 72; a digital-to-analog (D/A) converter 74; and a voltage controlled oscillator (VCO) 76. The output of the first preamplifier 53A of the input circuit 50 is connected to the input of the integrator 71. The output of the integrator 71, which is an analog signal, is applied to one input of the multiplier 72. The parallel data output of the first register 62 is applied to the input of the D/A converter 74 and the output of the D/A converter 74, which is also an analog signal, is applied to the second input of the multiplier 72. The output of the multiplier 72 is used to control the rate of production of pulses by the VCO 76, in an inverse manner. That is, as the output of the multiplier 72 goes up in value, the number of pulses produced by the VCO 76 per unit time goes down. The VCO output pulses, which are denoted step pulses, are applied to the step input of the motor control 42. Each time a VCO pulse occurs, the motor control causes the shaft of the stepping motor to step. The direction of rotation (e.g., clockwise or counterclockwise) is controlled by the direction signal produced by the direction control 90 in the manner hereinafter described.

In operation, the D/A converter provides a main control voltage that causes the output of the VCO to increase when the count value is low and decrease when the count value becomes high. As previously discussed high count values occur when the focusing lens is at or near the focus position. Thus, the rate of the pulses produced by the VCO decreases as focus is approached. The integrator output 71 provides damping to prevent oscillation about the focus position. More specifically, the integrator voltage increases the absolute magnitude of the voltage by an increasing multiplication factor as focus is approached because the rate of pulses occurring on the output of the first preamplifier increases as focus is approached. The increased level of the integrator output, because it increases the main control voltage produced by the D/A converter causes increased damping (reduced number of step pulses) as focus is approached. At focus, preferably, the VCO produces no step pulses so as to avoid focusing lens oscillation.

The direction control circuit 90 comprises: a digital comparator 91; a two input AND gate 93; and, a D flip-flop 95. The digital comparator 91 has two parallel data inputs designated A and B. The A input is connected to the output of the first register 62 and the B input is connected to the output of the second register 63. The output of the comparator, denoted A<B, is applied to one input of the AND gate 93. The A<B output is low when A is greater than B (or A equals B) and high when A is less than B. The output of the second one-shot 84 is applied to the second input of the AND gate 93. The output of the AND gate 93 is applied to the clock input of the D flip-flop 95. The Q output of the D flip-flop 95 is applied to the direction input of the motor control 42. The $\overline{Q}$ output of the D flip-flop 95 is applied to the D input of the D flip-flop 95.

In operation, as will be recognized from the foregoing description, the value of A is the count value made during the last count period. The value of B is the immediately preceding count value. Anytime the lens is approaching focus, regardless of the direction of approach, the A<B output of the comparator 91 is low because the output of the first register is greater than the output of the second register. Anytime the lens moves away from focus the A<B output is high because the output of the second register will be higher than the output of the first register. Specifically, as will be recognized from the foregoing discussion, the number of pulses counted is a maximum at focus. Thus, anytime the latest count value increases with respect to the previous count value, focus is being approached. This result occurs regardless of which direction focus is approached from. More specifically, as illustrated in FIG. 1, the focusing lens 30, can approach focus from the direction of the collimating lens 28 or from the direction of the moving surface 32. The A<B output is low as long as focus is being approached, regardless of the approach direction. Contrariwise, anytime the focusing lens moves away from focus, A becomes less than B. When this situation occurs, the A<B output of the comparator 91 shifts from low to high whereby the two input AND gate 93 is enabled.

When the AND gate 93 is enabled, it applies the next pulse occurring on the output of the second one-shot 84 to the clock input of the D flip-flop 95. Since the input of the D flip-flop is the $\bar{Q}$ output of the D flip-flop, each one-shot pulse passed by the AND gate 93 causes the Q and $\bar{Q}$ outputs of the D flip-flop to switch states. The high/low state of the Q output of the D flip-flop controls the direction of step motor stepping by controlling whether or not the step pulses are applied directly to the stepping motor or inverted prior to their application to the stepping motor. More specifically, as will be readily understood by those familiar with stepping motors, positive step pulses cause rotation of the stepping motor shaft in one direction (e.g., clockwise) and negative step pulses cause rotation in the opposite direction (e.g., counter-clockwise). As a result, when the Q output of the D flip-flop is high positive pulses may be applied to the stepping motor and, when the Q output is low negative pulses may be applied or vice versa. Thus, if the D flip-flop was previously in a state whereby the step pulses caused the stepping motor 44 to move the focusing lens 30 toward the part 32 and the lens passes through focus, the next second one-shot clock pulse will cause a reversal of the Q output of the D flip-flop (because A will not be less than B). As a result, the next step pulse will cause the stepping motor 44 to move in the opposite direction, i.e., back toward focus. As noted, preferably, at focus the step (VCO) pulses will cease.

In summary, the input circuit 50 illustrated in FIG. 2 is a cross-correlator that produces an output when both photodetectors are coincidentially illuminated. The pulses produced as a result of the coincidental detection of light are counted by the counter 61. At predetermined equal intervals, the count value is shifted first to the first register 62 and, then, to the second register 63. The outputs of the two registers are continuously compared by the comparator 91 and the result used to control the application of one-shot pulses to the D flip-flop 95. The application of a one-shot pulse to the D flip-flop 95 causes its outputs to shift states, whereby further step pulses applied to the stepping motor by the motor control 42 are shifted in polarity from their previous polarity. As a result, the direction of movement of the shaft of the stepping motor reverses. In order to avoid stochastic hunting around the focal point, i.e., continuous shifting back and forth, damping is provided by the integrator 71, as previously discussed. Without damping, lock-in at the in-focus position would never be achieved. Should a surface contour change be suddenly introduced, such as by a portion of the surface of the moving part 32 being removed by a machine tool, the output of the multiplier will immediately reduce in magnitude, whereby the VCO will start to produce pulses. As a result, the focusing lens will move in search of a new focus position. If the direction of movement starts out wrong, the direction will reverse as soon as A is found to be less than B.

Figure 3:
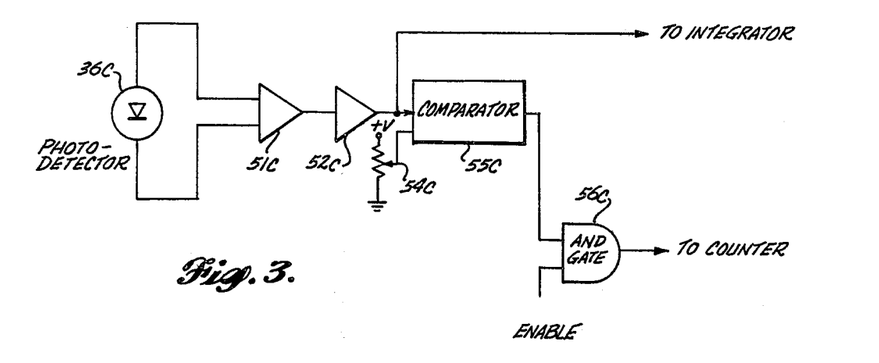
FIG. 3 is a block diagram of a single photodetector modification of the signal processor and motor control illustrated in FIG. 2.

As noted above, the invention can use a single photodetector sensing arrangement, as opposed to a dual photodetector sensing arrangement, if coincidence information is not needed or not desired. A modification of the input circuit using a single photodetector input is illustrated in FIG. 3. This input circuit depends solely on the phenomena that pulse rate increases at focus because a larger number of beam diameters are crossed per unit time by the moving surface of the moving part of focus. This input circuit does not depend at all on the phenomena that speckle size increases as focus is approached, except to the extent that increased speckle size may increase the magnitude of photodetector pulses and, thus, make them detectable where they would not be detectable when the focusing lens is not focused.

Basically, the input circuit illustrated in FIG. 3 is identical to the input circuit of FIG. 2, except that one photodetector channel is eliminated. Thus, the input circuit illustrated in FIG. 3 comprises a single photodetector channel including: an operational amplifier 51C; a preamplifier 52C; a potentiometer 54C; and, a comparator 55C; FIG. 3 also includes a two input AND gate 56C. The output of a single photodetector 36C is connected across the inputs of the operational amplifier 51C. The output of the operational amplifier 51C is connected to the input of the preamplifier 51C; and, the output of the preamplifier 51C is connected to one input of the comparator 55C. The other input of the comparator 55C is connected to the sliding element of the potentiometer 54C, which is connected between a voltage source designated +V and ground. The output of the comparator is connected to one input of the AND gate. An enable signal produced by a timing circuit 80 in the manner previously described is applied to the second input of the AND gate 56C. The output of the preamplifier 52C is connected to the integrator 71. The output of the AND gate 56C is connected to the counter 61.

In operation, as the moving part rotates and reflects the laser beam, the speckles of the resulting speckle pattern illuminate the photodetector 36C. This illumination causes the output of the operational amplifier to create speckle related pulses. The pulses are amplified by the preamplifier 52C and compared with the setting of the potentiometer 54C. If a pulse is of adequate magnitude, a corresponding pulse occurs on the output of the comparator 55C. Assuming the AND gate 56C is enabled, when a pulse occurs on the output of the comparator, the pulse is applied to the counter and counted. Since the counter and other elements of an overall signal processor using a single photodetector are identical to the dual photodetector arrangement illustrated in FIG. 2, and function in the manner discussed above they will not be further discussed here. The end result, of course, is the same, i.e., the focusing lens is moved to a focusing position and remains there until an out-of-focus situation occurs. When such a situation occurs, the focusing lens is automatically refocused. The change in the position of the focusing lens is related to the change in surface contour and is determinable by reading the position of the pointer on the scale or by counting stepping motor pulses with an up/down counter.

Figure 4:
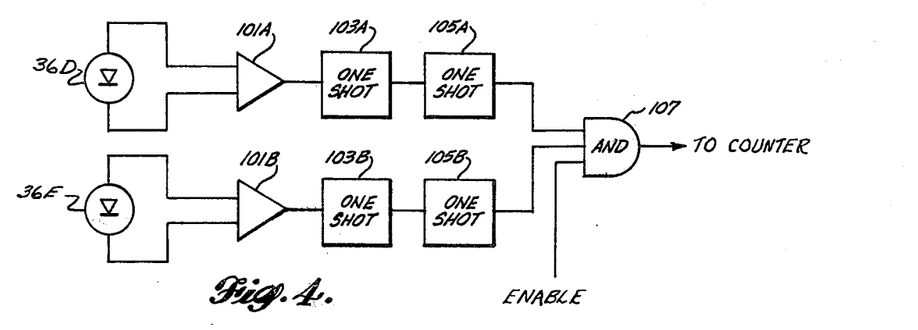
FIG. 4 is a block diagram of a modification of the signal processor and motor control system illustrated in FIG. 2.

FIG. 4 is a block diagram of an alternative embodiment of an input circuit suitable for use in the signal process illustrated in FIG. 2. As with the input circuit illustrated in FIG. 2, the input circuit illustrated in FIG. 4 is a cross-correlator and is used in combination with a pair of photodetectors mounted so as to simultaneously receive light from the same speckle when the system is in focus. However, the specific nature of the input circuit is substantially different.

The input circuit illustrated in FIG. 4 includes: first and second operational amplifiers 101A and 101B; first and second blanking one-shots 103A and 103B; first and second coincidence one-shots 105A and 105B; and, a three-input AND gate 107. The first operational amplifier 101A receives the signal occurring across the output of a first photodetector 36D and the output of the first operational amplifier 101A is connected to the input of the first blanking one shot 103A. The output of the first blanking one-shot 103A is connected to the input of the first coincidence one-shot 105A. The output of the first coincidence one-shot 105A is connected to one input of the AND gate 107. Similarly, the input of the second operational amplifier 101B receives the signal occurring across the output of a second photodetector 36E. The output of the second operational amplifier 101B is connected to the input of the second blanking one-shot 103B. The output of the second blanking one-shot 103B is connected to the input of the second coincidence one-shot 105B. The output of the second coincidence one-shot 105B is connected to the second input of the AND gate 107. The third input of the AND gate 107 is connected to the enable output of a timing circuit of the type illustrated in FIG. 2 and previously described.

In operation, when one or the other, or both of the operational amplifiers receive an input signal of suitable magnitude their respective blanking one-shots are fired. Firing of the blanking one-shots cause the related coincidence one-shots to be fired. The blanking one-shots have a relatively long time period, when compared to the time periods of the coincidents one-shots, as illustrated in FIG. 5 and hereinafter described.

Figure 5:
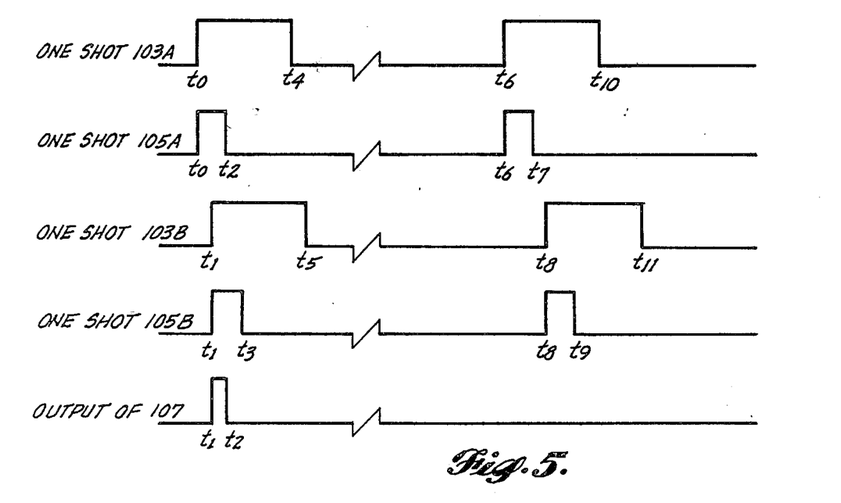
FIG. 5 is a timing diagram used to describe the operation of the modification illustrated in FIG. 4.

The first line of FIG. 5 illustrates the output of the blanking one-shot 103A, the second line illustrates the output of the first coincidence pulse one-shot 105A. The third line illustrates the output of the second blanking one-shot 103B and the fourth line illustrates the output of the second coincidence pulse one-shot 105B. The fifth line illustrates the output of the AND gate 107 for the conditions depicted directly above. In this regard, the left side of FIG. 5 illustrates a set of conditions, occurring between $t_0$ and $t_5$ that create a pulse on the output of the AND gate 107 and the right side illustrates a set of conditions occurring between $t_6$ and $t_{11}$ that do not create a pulse, even though both photodetectors receive speckle light.

Turning first to a discussion of the left side of FIG. 5, at $t_0$, light is detected by the photodetector 36D connected to the first operational amplifier 101A. As a result, both the first blanking one-shot 105A and the first coincidence pulse 105A are fired (triggered) at $t_0$. The first blanking one-shot pulse is present from $t_0$ to $t_4$, whereby any further pulses occurring on the output of first operational amplifier 101A will have no effect, i.e., a pulse occurring on the output of the first operational amplifier between $t_0$ and $t_4$ will not fire the first blanking one-shot because it is in a fired (high output) state. At $t_2$, the output of the first coincidence one-shot terminates. However, prior to $t_2$, at $t_1$, the second operational amplifier 101B receives an output from its related photodetector 36E, whereby the second blanking one-shot 103B and the second coincidence one-shots 103B and 105B are fired. Since $t_1$ occurs before $t_2$, between $t_1$ and $t_2$, both of the coincidence pulse inputs to the AND gate 107 are high. Assuming the AND gate is enabled, a pulse occurs on its output. This pulse terminates at $t_2$, when the output of the first coincidence one-shot 103A terminates. Thereafter at $t_3$ the output of the second coincidence pulse one-shot terminates. At $t_4$ and $t_5$ the outputs of the blanking one-shots, respectively, terminate and the system has completed a cycle of operation.

On the right side of FIG. 5, the first blanking one-shot 103A is fired at $t_6$ and remains fired until $t_{10}$. From $t_6$ to $t_7$, the first coincidence one-shot 105A is fired. At $t_8$, which occurs after $t_7$, the second operational amplifier fires the second blanking one-shot 103B and the second coincidence one-shot 105B. Since $t_8$ occurs after the termination of the pulse on the output of the first coincidence one-shot 105A, the second blanking one-shot 103B and the second coincidence one-shot 105B are fired too late for pulse coincidence to occur on the coincidence one-shot inputs of the AND gate 107. Thus, no pulse occurs on the output of the AND gate and the counter is not incremented.

In summary, FIG. 4 illustrates a correlation type input circuit that provides the same general result as the input circuit illustrated in FIG. 2 and previously described, albeit in a different manner. The result is a series of pulses whose rate depends on speckle rate and speckle size, as opposed to speckle rate alone. Speckle size has an effect because, as previously discussed, illumination coincidence increases as speckle size increases, and speckle size increases as focus is approached.

It should be noted that while the surface of the part 32 is moving, the speed of movement does not have to be known for the invention to operate. Similarly, the focal length of the lenses does not have to be known. These items do not have to be known because the optical system and processing electronics parameters do not enter into the calibration of the overall system. Rather, the only calibrated parts are the mechanical position of the carriage with respect to the indicator, and the level of the pulses to be recognized (counted).

It will be appreciated from the foregoing discussion that a new and improved gauge for measuring the dimensional variations of the surface of a moving part is provided by the invention. It has been found that contour changes in the approximate $10^{-4}$ range can be detected. The gauge of the present invention utilizes the change in characteristics (size and ratio), of the speckle reflection of laser light from a rough surface to provide an indication of contour variation. The invention provides a mechanism wherein light is directed toward a reflecting surface and the focus condition of the light is the condition that is detected. When the light is not focused on the reflecting surface, electronic signals are used to control a stepping motor that moves a focusing lens toward focus. The distance between the focusing lens and the surface is indicated by counting stepping motor pulses or on a scale which can be calibrated in terms of contour variation. Because the actual surface of the part, as opposed to a tool or other surface is utilized, machine wear, tool wear and misalignments are eliminated as sources of error in the measurement. Moreover, the gauge is a noncontacting gauge, whereby, disadvantages created by contacting instruments are not present. Also, the gauge can be mounted a significant distance from the surface of the part.

While preferred embodiments of the invention have been illustrated and described, as will be appreciated by those skilled in the art and others various changes can be made therein without departing from the spirit and scope of the invention. For example, rather than usuing a visually readable gauge, an electronic position sensor can be used to sense the changes in position of the focusing lens and, thus, dimensional variations. The sensed position information can be used to control an electronic display, or used to control the position of a cutting tool, if desired. Also, coherent light sources, other than a laser can be utilized, if desired, even though a laser is preferred. Moreover, as noted, while the invention was developed primarily for use in machine tool gauging, it can be used in other environments. In general, the invention is useful in many environments wherein the contour variations of a moving surface, with respect to a position normal to the moving surface, are to be determined. Thus, the invention can be used in combination with a focusing device for a high speed camera system designed to take photographs of a moving surface. Moreover, while a stepping motor is the preferred mechanism for moving the focusing lens, other types of linear moving devices, including hydraulic and pneumatic devices can be utilized, if desired. Hence, within the scope of the appendant claims, the invention can be practiced otherwise than as specifically described herein.

The embodiments of the invention in which an exclusive property or privilege is claimed are defined as follows:

1. Apparatus for measuring changes in the contour of the surface of a moving part comprising:
   (a) a source of coherent light;
   (b) optical means for:
      (1) directing light produced by said source of coherent light along an optical axis onto the surface of a moving part;
      (2) receiving light reflected by said moving part; and,
      (3) producing a moving speckle pattern formed of light and dark spots based on said reflected light, said optical means including a focusing lens movable toward and away from said surface of said moving part so as to focus said light produced by said source of coherent light onto the surface of said moving part;
   (c) light detecting means mounted so as to detect said moving speckle pattern and develop pulses at a rate related to the rate of movement of the light spots forming said pattern;
   (d) signal processing means connected to said light detecting means for counting said pulses, comparing pulse counts made during adjacent equal time intervals and producing movement control signals based on said pulse count comparison; and,
   (e) position control means connected to said signal processing means for receiving said movement control signals and to said focusing lens for moving said focusing lens in accordance with said movement control signals.

2. Apparatus for measuring changes in the contour of the surface of a moving part as claimed in claim 1 wherein said movement control signals include magnitude and direction information, said magnitude information being inversely related to the magnitude of one of said compared pulse counts and said direction information being related to whether or not said pulse counts are increasing or decreasing.

3. Apparatus for measuring changes in the contour of the surface of a moving part as claimed in claim 2 wherein said focusing lens movement is in a direction such that said pulse counts made during adjacent equal time intervals are caused to increase.

4. Apparatus for measuring changes in the contour of the surface of a moving part as claimed in claim 3, wherein said optical means includes:
   an expanding lens for receiving a beam of light produced by said source of coherent light and expanding said beam; and,
   a collimating lens for receiving and collimating said expanded beam, said focusing lens and said collimating lens being mounted along an optical axis coincident with the optical axis along which light is directed onto the surface of said moving part.

5. Apparatus for measuring changes in the contour of the surface of a moving part as claimed in claim 4, wherein said optical means also includes a redirecting means mounted between said focusing lens and said collimating lens for redirecting light, reflected by said surface of said moving part back toward said focusing lens along said optical axis, toward said light detecting means.

6. Apparatus for measuring changes in the contour of the surface of a moving part as claimed in claim 5, wherein said source of coherent light is a laser.

7. Apparatus for measuring changes in the contour of the surface of a moving part as claimed in claim 5, wherein said light detecting means includes at least one light detecting element mounted at the focal plane of said focusing lens on the side of said focusing lens remote from said surface of said moving part.

8. Apparatus for measuring changes in the contour of the surface of a moving part as claimed in claim 7, wherein said signal processor includes counting and storing means for counting pulse counts made during said adjacent equal time intervals and storing pulse counts related to said adjacent equal time intervals.

9. Apparatus for measuring changes in the contour of the surface of a moving part as claimed in claim 8, wherein:
   said counting and storing means includes a counter for counting pulses occurring during said adjacent equal time intervals and first and second registers for storing pulse counts made during said adjacent equal time intervals;
   said signal processor includes a direction control circuit for comparing said pulse counts made during said adjacent equal time intervals, and stored in said first and second registers, and producing a direction signal whose nature is determined by which of said pulse counts is greater than the other of said pulse counts stored in said first and second registers, said direction signal forming a part of said movement control signals; and,
   said signal processor also includes timing means connected to said counter and said first and second register for causing the transfer of pulse counts made by said counter first to said first register and then to said second register.

10. Apparatus for measuring changes in the contour of the surface of a moving part as claimed in claim 9 wherein said signal processor includes a step control circuit for receiving the output of one of said first and second registers and producing step pulses at a rate inversely related to the magnitude of the pulse counts stored in said one of said first and second registers, said step pulses forming a portion of said movement control signals.

11. Apparatus for measuring changes in the contour of the surface of a moving part as claimed in claim 10, wherein said step control circuit includes:
   an integrator having its input connected to receive pulses developed by said at least one light detecting element;
   a digital-to-analog converter connected to the output of said one of said first and second registers;
   a multiplier connected to the output of said integrator and to the output of said digital-to-analog converter; and, a voltage controlled oscillator connected to the output of said multiplier such that the frequency of the pulses produced by said voltage control oscillator are inversely related to the output of said multiplier, said pulses produced by said voltage controlled oscillator forming said step pulses.

12. Apparatus for measuring changes in the contour of the surface of a moving part as claimed in claim 11, wherein said position control means includes:
   a stepping motor connected to said focusing lens so as to move said focusing lens along said optical axis toward and away from said surface of said moving part; and,
   a motor control circuit connected to receive said direction signal and said step pulses and, in accordance therewith, apply step control pulses to said stepping motor.

13. Apparatus for measuring changes in the contour of the surface of a moving part as claimed in claim 12, wherein said light detecting means includes an input circuit connected to said at least one light detecting element for selectively producing pulses in accordance with light spots detected by said light detecting element.

14. Apparatus for measuring changes in the contour of the surface of a moving part as claimed in claim 13 wherein said input circuit includes a gate connected to said timing means so as to be enabled by said timing means, said gate having an input connected to receive said selectively produced pulses.

15. Apparatus for measuring changes in the contour of the surface of a moving part as claimed in claim 3 wherein said pulse rate developed by said light detecting means is based on the size of said light spots forming said speckle pattern, as well as the rate of movement of said light spots.

16. Apparatus for measuring changes in the contour of the surface of a moving part as claimed in claim 15, wherein said optical means includes:
   an expanding lens for receiving a beam of light produced by said source of coherent light and expanding said beam; and,
   a collimating lens for receiving and collimating said expanded beam, said focusing lens and said collimating lens being mounted along an optical axis coincident with the optical axis along which light is directed onto the surface of said moving part.

17. Apparatus for measuring changes in the contour of the surface of a moving part as claimed in claim 16, wherein said optical means also includes a redirecting means mounted between said focusing lens and said collimating lens for redirecting light, reflected by said surface of said moving part back toward said focusing lens along said optical axis, toward said light detecting means.

18. Apparatus for measuring changes in the contour of the surface of a moving part as claimed in claim 17, wherein said source of coherent light is a laser.

19. Apparatus for measuring changes in the contour of the surface of a moving part as claimed in claim 17, wherein said light detecting means includes two light detecting elements mounted at the focal plane of said focusing lens on the side of said focusing lens remote from said surface of said moving part.

20. Apparatus for measuring changes in the contour of the surface of a moving part as claimed in claim 19, wherein said signal processor includes counting and storing means for counting pulse counts made during said adjacent equal time intervals and storing pulse counts related to said adjacent equal time intervals.

21. Apparatus for measuring changes in the contour of the surface of a moving part as claimed in claim 21, wherein:
   said counting and storing means includes a counter for counting pulses occurring during said adjacent equal time intervals and first and second registers for storing pulse counts made during said adjacent equal time intervals;
   said signal processor includes a direction control circuit for comparing said pulse counts made during said adjacent equal time intervals, and stored in said first and second registers, and producing a direction signal whose nature is determined by which of said pulse counts is greater than the other of said pulse counts stored in said first and second registers, said direction signal forming a part of said movement control signals; and,
   said signal processor also includes timing means connected to said counter and said first and second register for causing the transfer of pulse counts made by said counter first to said first register and then to said second register.

22. Apparatus for measuring changes in the contour of the surface of a moving part as claimed in claim 21 wherein said signal processor includes a step control circuit for receiving the output of one of said first and second registers and producing step pulses at a rate inversely related to the magnitude of the pulse counts stored in said one of said first and second registers, said step pulses forming a portion of said movement control signals.

23. Apparatus for measuring changes in the contour of the surface of a moving part as claimed in claim 22, wherein said step control circuit includes:
   an integrator having its input connected to receive pulses developed by one of said two light detecting elements;
   a digital-to-analog converter connected to the output of said one of said first and second registers;
   a multiplier connected to the output of said integrator and to the output of said digital-to-analog converter; and,
   a voltage controlled oscillator connected to the output of said multiplier such that the frequency of the pulses produced by said voltage control oscillator are inversely related to the output of said multiplier, said pulses produced by said voltage controlled oscillator forming said step pulses.

24. Apparatus for measuring changes in the contour of the surface of a moving part as claimed in claim 23, wherein said position control means includes:
   a stepping motor connected to said focusing lens so as to move said focusing lens along said optical axis toward and away from said surface of said moving part; and,
   a motor control circuit connected to receive said direction signal and said step pulses and, in accordance therewith, apply step control pulses to said stepping motor.

25. Apparatus for measuring changes in the contour of the surface of a moving part as claimed in claim 24, wherein said light detecting means includes an input circuit connected to said two light detecting elements for selectively producing pulses in accordance with light spots detected by said light detecting element.

26. Apparatus for measuring changes in the contour of the surface of a moving part as claimed in claim 25 wherein said input circuit includes a gate connected to said timing means so as to be enabled by said timing means, said gate having an input connected to receive said selectively produced pulses.

27. Apparatus for measuring changes in the contour of the surface of a moving part as claimed in claim 26, wherein said input circuit includes first and second pulsing channels, each connected to one of said first and second light detecting elements, for producing pulses only if pulses developed by said light detecting elements based on said light spots forming said speckle pattern are above a predetermined level.

28. Apparatus for measuring changes in the contour of the surface of a moving part as claimed in claim 27, wherein said gate is a three input AND gate, one of said inputs connected to an output of said timing circuit and the other of said inputs connected to the outputs of said first and second pulsing channels, whereby said AND gate produces output pulses only when enabled by said timing circuit and only if said first and second pulsing channels coincidentally produce pulses.

29. Apparatus for measuring changes in the contour of the surface of a moving part as claimed in claim 28, wherein said first and second pulsing channels each include a comparator, one input of each of said comparators connected to a voltage source of known magnitude and the other input connected to receive pulses developed by the related said first and second light detecting elements, said comparators producing an output pulse only if the pulses developed by said first and second light detecting elements are above the level determined by the voltage source inputs of said first and second comparators, the output of said first and second comparators each connected to one input of said three input AND gate.

30. Apparatus for measuring changes in the contour of the surface of a moving part as claimed in claim 26, wherein said input circuit includes first and second channels, each of said channels connected to one of said first and second light detecting elements, each of said channels including a blanking one shot and a coincident one shot connected in series, said blanking one shot and said coincident one shot being triggered when a pulse is developed across the related light detecting element, said coincident one shot producing a pulse for a substantially shorter period of time than said blanking one shot.

31. Apparatus for measuring changes in the contour of the surface of a moving part as claimed in claim 30 wherein said gate is a three input AND gate, one of said inputs connected to an output of said timing circuit and the other inputs connected to the outputs of said first and second channels, whereby said AND gate only produces an output pulse when enabled by said timing circuit and only if said first and second channels coincidentally produce pulses.

* * * * *

UNITED STATES PATENT AND TRADEMARK OFFICE
CERTIFICATE OF CORRECTION

PATENT NO. : 4,148,587
DATED : April 10, 1979
INVENTOR(S) : Joachim C. Erdmann

It is certified that error appears in the above-identified patent and that said Letters Patent are hereby corrected as shown below:

Column 4, line 56: "interferrometer is changed to --interferometer--.

Column 4, line 58: "interferrometer" is changed to --interferometer--.

Column 14, line 59: "usuing" is changed to --using--.

Column 15, line 37: "said pattern" is changed to --said speckle pattern--.

Column 18, line 4: "claim 21" is changed to --claim 20--.

Signed and Sealed this

Sixteenth Day of October 1979

[SEAL]

Attest:

RUTH C. MASON
Attesting Officer

LUTRELLE F. PARKER
Acting Commissioner of Patents and Trademarks